US010129702B1

(12) United States Patent
Scellato et al.

(10) Patent No.: US 10,129,702 B1
(45) Date of Patent: Nov. 13, 2018

(54) METHODS AND SYSTEMS FOR DETERMINING SEMANTIC LOCATION INFORMATION

(71) Applicant: Google LLC, Mountain View, CA (US)

(72) Inventors: Salvatore Scellato, London (GB); Chetan Bhadricha, Fremont, CA (US); Tanmay Khirwadkar, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/871,387

(22) Filed: Jan. 15, 2018

Related U.S. Application Data

(60) Provisional application No. 62/572,909, filed on Oct. 16, 2017.

(51) Int. Cl.
| | |
|---|---|
| *H04W 24/00* | (2009.01) |
| *H04W 4/02* | (2018.01) |
| *H04L 29/08* | (2006.01) |
| *H04W 64/00* | (2009.01) |
| *G06F 17/30* | (2006.01) |

(52) U.S. Cl.
CPC ...... *H04W 4/025* (2013.01); *G06F 17/30241* (2013.01); *H04L 67/10* (2013.01); *H04W 64/00* (2013.01)

(58) Field of Classification Search
CPC .. G06F 17/30864; H04W 4/025; H04W 68/00
USPC ............ 455/404.1, 404.2, 456.1–457; 340/539.13, 988–996; D10/104.2
See application file for complete search history.

(56) References Cited

U.S. PATENT DOCUMENTS 9,047,259 B1 * 6/2015 Ho ............... G06F 17/30882
2013/0282481 A1 * 10/2013 Kent ............... G06Q 30/0251
705/14.49

FOREIGN PATENT DOCUMENTS

WO   WO 2016/200865   12/2016

OTHER PUBLICATIONS

PCT International Search Report and Written Opinion for corresponding PCT Application No. PCT/US2018/040889, dated Sep. 21, 2018, 13 pages.

(Continued)

*Primary Examiner* — Ronald Eisner
(74) *Attorney, Agent, or Firm* — Dority & Manning, P.A.

(57) ABSTRACT

The present disclosure provides systems and methods for determining semantic location information. In particular, one or more computing devices can receive, from an application program executing on at least one of the one or more computing devices, an application programming interface (API) call requesting semantic information about a location of at least one of the one or more computing devices. Responsive to receiving the API call, the one or more computing devices can determine semantic information for the location and can return the semantic information for the location to the application program via the API. The semantic information for the location can comprise data semantically identifying the location and indicating whether a user associated with the one or more computing devices is stationary at the location or in transit from the location.

4 Claims, 12 Drawing Sheets

(56) References Cited

OTHER PUBLICATIONS

Stenneth et al., "Transportation Mode Detection using Mobile Phones and GIS Information", International Conference on Advances in Geographic Information Systems, Chicago, Illinois, Nov. 1-4, 2011, 10 pages.

Wikipedia, "Client-Server Model", https://en.wikipedia.org/wiki/Client%E2%80%93server_model, Retrieved on Oct. 9, 2018, 5 pages.

* cited by examiner

```
SemanticLocation

- Timestamp: 1234
- State: AT_PLACE
- TransitMode: type=UNKNOWN, likelihood=1.0
- PlaceHierarchy:
    - id=ID1, likelihood=0.7
    - id=ID2, likelihood=0.85
```

FIG. 3A

```
SemanticLocation

— Timestamp: 5678
— State: IN_TRANSIT
— TransitType: type=ON_TRAIN, likelihood=0.8
— PlaceHierarchy: []
```

FIG. 3B

```
SemanticLocationEvent (with full estimates)

- Previous SemanticLocation:
  |  - Timestamp: 1000
  |  - State: AT_PLACE
  |  - TransitType: type=WALKING, likelihood=0.3
  |  - PlaceHierarchy: [id=ID6, likelihood=0.5]
- Current SemanticLocation:
  |  - Timestamp: 2000
  |  - State: IN_TRANSIT
  |  - TransitType: type=DRIVING, likelihood=0.9
  |  - PlaceHierarchy: [id=ID6, likelihood=0.1]
```

*FIG. 3C*

```
SemanticLocationEvent (without estimates)

- Previous SemanticLocation:
  - Timestamp: 1000
  - State = AT_PLACE
- Current SemanticLocation:
  - Timestamp: 2000
  - State = IN_TRANSIT
```

*FIG. 3D*

```
boolean fullEstimation = true;
EstimationOptions options = EstimationOptions.create(fullEstimation);
SemanticLocation currentLocation =
    SemanticLocationProviderAPI.estimateSemanticLocation(options).await();

// Check whether user is at-place or in-transit.
SemanticLocationState state = currentLocation.getState();
if (state == SemanticLocationState.AT_PLACE) {
    List<PlaceEstimate> placeHierarchy = currentLocation.getPlaceHierarchy();
    System.out.println("At place - ID " + placeHierarchy.get(0).getId());
} else if (state == SemanticLocationState.ON_THE_GO) {
    System.out.println("In-Transit - type "
        + currentLocation.getTransitMode().getType());
}
```

*FIG. 4A*

```
// Start semantic location estimation.
int transitionMask =
    SemanticEventType.PLACE_ENTER | SemanticEventType.PLACE_EXIT;
boolean estimateDetails = true;
EstimationOptions options = EstimationOptions.create(estimateDetails);
SemanticLocationEventRequest request = new SemanticLocationEventRequest(
    Priority.ACTIVE, transitionMask, options);

SemanticLocationProviderAPI.startSemanticLocationUpdates(
    request, pendingIntent);

// Receive semantic location events.
SemanticLocationEvent event = SemanticLocationEvent.readFromIntent(intent);
SemanticLocation previous = event.getPreviousSemanticLocation();
SemanticLocation current = event.getCurrentSemanticLocation();

if (previous.getState() == SemanticLocationState.AT_PLACE) {
    PlaceEstimate placeEstimate = previous.getPlaceHierarchy(0);
    String placeId = placeEstimate.getId();
    System.out.println("Exited place " + placeId);
}
if (current.getState() == SemanticLocationState.AT_PLACE) {
    PlaceEstimate placeEstimate = previous.getPlaceHierarchy(0);
    String placeId = placeEstimate.getId();
    System.out.println("Entered place " + placeId);
}
```

FIG. 4B

```
// Start semantic location estimation.
int transitionMask =
    SemanticEventType.PLACE_ENTER | SemanticEventType.PLACE_EXIT;
boolean estimateDetails = false;
EstimationOptions options = EstimationOptions.create(estimateDetails);
SemanticLocationEventRequest request = new SemanticLocationEventRequest(
    Priority.ACTIVE, transitionMask, options);

SemanticLocationProviderAPI.startSemanticLocationUpdates(
    request, pendingIntent);

// Receive semantic location events.
SemanticLocationEvent event = SemanticLocationEvent.readFromIntent(intent);

SemanticLocation previous = event.getPreviousSemanticLocation();
SemanticLocation current = event.getCurrentSemanticLocation();

if (previous.getState() == SemanticLocationState.IN_TRANSIT) {
    System.out.println("User stopped moving");
}
if (current.getState() == SemanticLocationState.AT_PLACE) {
    System.out.println("User arrived at place");
}
```

*FIG. 4C*

METHODS AND SYSTEMS FOR DETERMINING SEMANTIC LOCATION INFORMATION

PRIORITY CLAIM

This application claims priority to U.S. Patent Application Ser. No. 62/572,909, filed Oct. 16, 2017, and entitled "METHODS AND SYSTEMS FOR DETERMINING SEMANTIC LOCATION INFORMATION," the disclosure of which is incorporated by reference herein in its entirety.

FIELD

The present disclosure relates generally to determining semantic location information. More particularly, the present disclosure relates to an application programming interface (API) for determining semantic location information.

BACKGROUND

Mobile computing devices can be configured to determine their geographic location via numerous methodologies. For example, some mobile computing devices include a global positioning system (GPS) receiver and can determine geographic location information (e.g., latitude and longitude coordinates) based on signals received via such a receiver. Additionally or alternatively, mobile computing devices can determine their location using received terrestrial communication signals, for example, by triangulating their position based on the known locations of devices transmitting the signals, determining proximity to a signal associated with a transmitter having a known location, the strength of such signals, and/or the like.

SUMMARY

Aspects and advantages of embodiments of the present disclosure will be set forth in part in the following description, or can be learned from the description, or can be learned through practice of the embodiments.

One example aspect of the present disclosure is directed to a method for determining semantic location information. The method can include receiving, by one or more computing devices and from an application program executing on at least one of the one or more computing devices, an application programming interface (API) call requesting semantic information about a location of at least one of the one or more computing devices. The method can include, responsive to receiving the API call: determining, by the one or more computing devices, semantic information for the location; and returning, by the one or more computing devices, to the application program, and via the API, the semantic information for the location. The semantic information for the location can comprise data semantically identifying the location and indicating whether a user associated with the one or more computing devices is stationary at the location or in transit from the location.

Another example aspect of the present disclosure is directed to a system for determining semantic location information. The system can include one or more processors and a memory storing instructions that when executed by the one or more processors cause the system to perform operations. The operations can include receiving, from an application program being executed by the system, an API call requesting updates in response to one or more changes in semantic information about a location of a computing device of the system. The operations can include, responsive to receiving the API call: determining a change in semantic information for the location comprising data semantically identifying the location and indicating whether a user associated with the computing device is stationary at the location or in transit from the location; and, responsive to determining the change in the semantic information, returning, to the application program and via the API, the semantic information.

Another example aspect of the present disclosure is directed to one or more non-transitory computer-readable media. The one or more non-transitory computer-readable media can comprise instructions that when executed by one or more computing devices cause the one or more computing devices to perform operations. The operations can include receiving, from an application program executing on at least one of the one or more computing devices, an API call requesting semantic information about a location of at least one of the one or more computing devices. The operations can include, responsive to receiving the API call: determining that the location corresponds to a plurality of semantically identifiable locations; determining a hierarchy of the plurality of semantically identifiable locations that indicates one or more semantically identifiable locations of the plurality are within one or more other semantically identifiable locations of the plurality; and returning, to the application program and via the API, data indicating the hierarchy.

Other aspects of the present disclosure are directed to various systems, apparatuses, non-transitory computer-readable media, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A-D depict example data objects according to example embodiments of the present disclosure;

FIGS. 4A-C depict example pseudo code for example methods according to example embodiments of the present disclosure.

DETAILED DESCRIPTION

Figure 1:
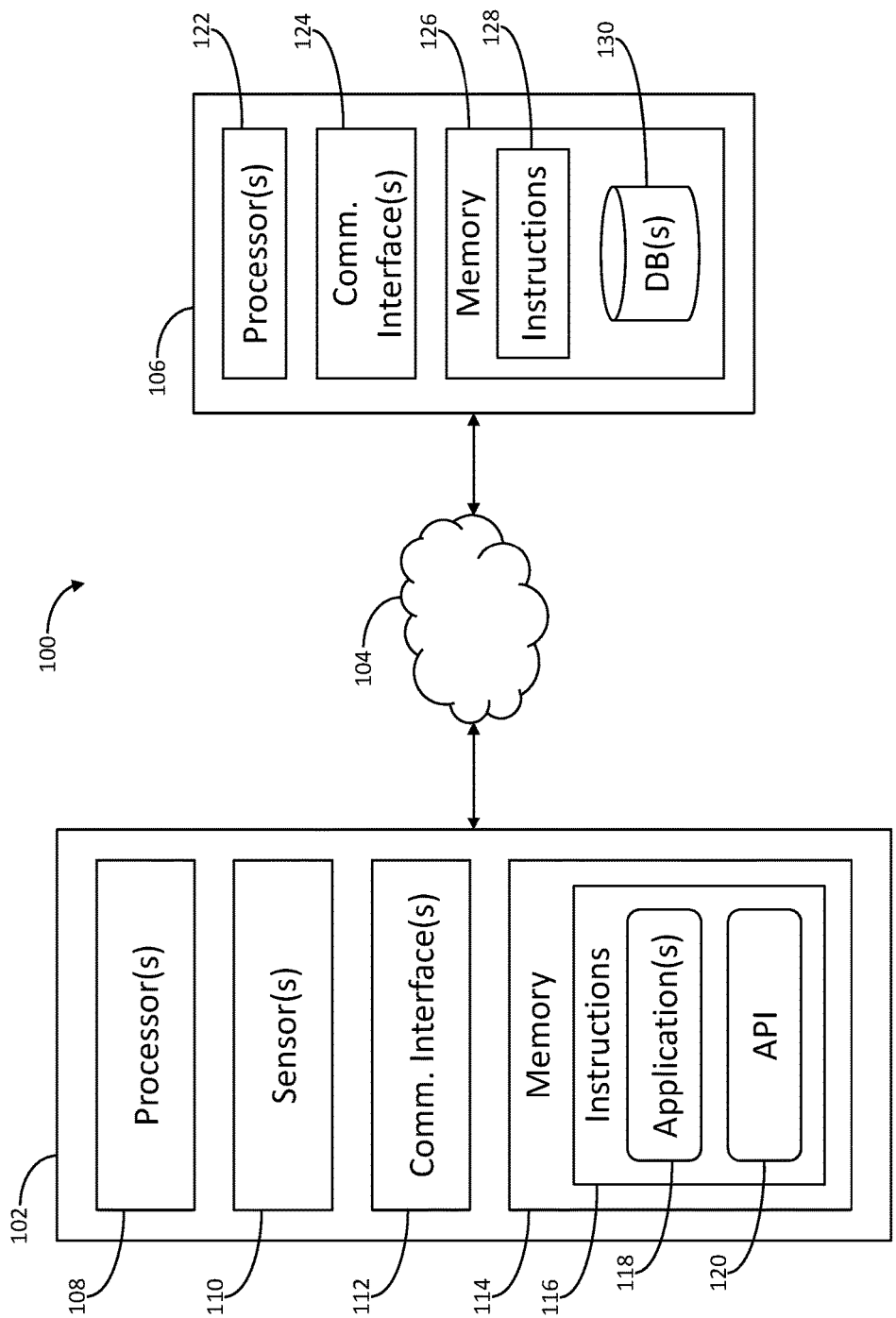
FIG. 1 depicts an example computing environment according to example embodiments of the present disclosure.

Example aspects of the present disclosure are directed to methods and systems for determining semantic location information. In particular, an application programming interface (API) is provided. For example, the API can be provided by a mobile computing device (e.g., a smartphone, and/or the like) to one or more applications executing on the mobile computing device and/or on one or more associated devices. The API can receive a call from one of the applications requesting semantic information about a location (e.g., the current location, a most recently determined location, or the like) of the mobile computing device, determine semantic information for the location, and return the semantic information to the requesting application. The semantic information can include data semantically identifying the location (e.g., describing the location in an easily understandable and meaningful way in terms of a spoken language). For example, the data can comprise and/or reference a street address associated with the location, the name of one or more businesses associated with the location, the name of a road and/or street associated with the location, the name and/or identifier of transit infrastructure associated with the location, and/or the like. The semantic information can also include data indicating whether a user associated with the mobile computing device (e.g., a person currently in possession of the mobile computing device) is stationary at the location (e.g., inside a shopping mall, and/or the like) or in transit from the location (e.g., driving down a street headed away from the shopping mall, and/or the like).

As indicated above, in some embodiments, the API can determine semantic information comprising data indicating that the user is in transit from the location. In such embodiments, the API can determine a modality of the transit (e.g., driving, riding a train, flying, walking, utilizing mass transit infrastructure, and/or the like) and return data indicating the modality to the requesting application.

In some embodiments, the API call can request semantic information about a most recently determined location. In such embodiments, the API can determine, based on stored historical data (e.g., data stored on the mobile computing device, and/or the like), data semantically identifying the most recently determined location and can return, to the requesting application, the data semantically identifying the most recently determined location. For example, multiple applications associated with the mobile computing device (e.g., executing on the mobile computing device and/or on one or more associated computing devices, and/or the like) can be configured to utilize the API. An application can request semantic information about a location of the mobile computing device, the API can determine the semantic information, return the semantic information to the requesting application, and store the semantic information. Subsequently, a different application can request semantic information about a location of the mobile computing device. The subsequent request can be made by making a call to the API requesting a most recently determined location. For example, the subsequently requesting application can be configured to conserve resources of the mobile computing device (e.g., processing resources, power resources, and/or the like), an application that is less sensitive to changes in location, and/or the like. Accordingly, responsive to the subsequent request, the API can utilize the previously stored semantic information to determine data semantically identifying the most recently determined location and can return the data semantically identifying the most recently determined location to the subsequently requesting application (e.g., without determining anew the location of the mobile computing device and/or the corresponding semantic information).

In some embodiments, the API call can request semantic information about a contemporaneously determined location. In such embodiments, the API can determine, based on contemporaneous sensor data (e.g., data generated by one or more sensors of the mobile computing device), data semantically identifying the contemporaneously determined location and can return, to the requesting application, the data semantically identifying the contemporaneously determined location. For example, the mobile computing device and/or one or more associated computing devices can include one or more sensors (e.g., global positioning system (GPS) receivers, accelerometers, gyroscopes, communication interfaces, and/or the like) configured to receive and/or determine data that can be utilized to determine the current location of the mobile computing device. An application (e.g., executing on the mobile computing device and/or on one or more associated computing devices, and/or the like) can be sensitive to the location of the mobile computing device and can thus desire contemporaneously determined (e.g., current, relatively recent, and/or the like) semantic information about the location of the mobile computing device. Such an application can request the semantic information by making a call to the API requesting semantic information about a contemporaneously determined location. In response to the request, the API can determine, based on contemporaneous data from the sensor(s) of the mobile computing device (e.g., by requesting current data from the sensor(s), and/or the like), data semantically identifying the contemporaneously determined location and can return the data semantically identifying the contemporaneously determined location to the requesting application.

In some embodiments, the API call can request updates in response to one or more changes in the semantic information. In such embodiments, the API can determine a change in the semantic information and, responsive to determining the change in the semantic information, can return data indicating the change in the semantic information. For example, an application (e.g., executing on the mobile computing device and/or on one or more associated computing devices, and/or the like) can be sensitive to changes in the location of the mobile computing device and can thus desire to be notified in response to changes in the semantic information. Such an application can make a call to the API requesting updates in response to one or more changes in the semantic information. In response to the request, the API can determine a change in the semantic information (e.g., based on a change in location of the mobile computing device) and, responsive to determining the change in the semantic information, can return data indicating the change in the semantic information to the requesting application. In some embodiments, the change can be that the user is determined to be located at a semantically identifiable location distinct from a semantically identifiable location at which the user was previously determined to be located. For example, the API can determine that the user is located at a business different from a business at which the user was previously determined to be located. In some embodiments, the change can be that the user is determined to be in transit from a location at which the user was previously determined to be stationary. For example, the API can determine that the user has left a business at which the user was previously determined to be located and is now on a road driving away from the business. In some embodiments, the change can be that the user is determined to be in transit via a modality different from a modality via which the user was previously determined to be in transit. For example, the API can determine that the user previously determined to be driving is now walking.

As indicated above, the semantic information can include data semantically identifying the location. In some embodiments, the data semantically identifying the location can comprise an identifier corresponding to an entry in a database (e.g., a database of places). In such embodiments, the mobile computing device (and/or an associated computing device) (e.g., the application that requested the semantic information) can utilize the identifier to request additional data (e.g., descriptive information, and/or the like) about the location. For example, a remotely located computing system can host the database that includes the entry corresponding to the identifier, and the mobile computing device (and/or an associated computing device) (e.g., the application that requested the semantic information) can communicate a request that includes the identifier to the remotely located computing system and receive the additional data (e.g., data included in the entry corresponding to the identifier, identified by the remotely located computing system using the identifier, and/or the like) from the remotely located computing system.

In some embodiments, the API can determine one or more confidence levels regarding the determined semantic information. In such embodiments, data indicating the confidence level(s) can be returned to the requesting application. For example, the API can determine a level of confidence (e.g., a value (e.g., [0, 1]) indicating a degree of confidence) that the data semantically identifying the location is accurate (e.g., the data semantically identifying the location can indicate that the location corresponds to a particular business, the level of confidence can indicate the degree to which the API is confident the location actually corresponds to the particular business, and/or the like). Additionally or alternatively, the API can determine a level of confidence (e.g., a value (e.g., [0, 1]) indicating a degree of confidence) that the data indicating the modality of transit is accurate (e.g., the data indicating the modality of transit can indicate the user is walking, the level of confidence can indicate the degree to which the API is confident the user is actually walking, and/or the like).

In some embodiments, the API can determine that the location corresponds to multiple semantically identifiable locations. For example, the API can determine that the location corresponds to a coffee shop, a mall, and a shopping center. In such embodiments, the API can determine a hierarchy of the multiple semantically identifiable locations and can return data indicating the hierarchy to the requesting application. For example, the API can determine that the coffee shop is within the mall and that the mall is within the shopping center, and the hierarchy can indicate that the coffee shop is within the mall and that the mall is within the shopping center.

The systems and methods described herein can provide a number of technical effects and benefits. For example, by enabling a computing system to locally determine semantic location information, the systems and methods described herein can increase user privacy (e.g., regarding their location). Additionally, by enabling multiple applications to utilize common functionality to determine semantic location information, the systems and methods described herein can reduce resource consumption (e.g., processing resources, network resources, power resources, and/or the like), for example, by obviating redundant and/or unnecessary location determinations.

With reference now to the Figures, example embodiments of the present disclosure will be discussed in further detail.

FIG. 1 depicts an example computing environment according to example embodiments of the present disclosure. Referring to FIG. 1, environment 100 can include computing systems 102 and 106 and one or more networks 104 (e.g., one or more wired and/or wireless networks, and/or the like), which can interface systems 102 and 106.

System 102 can include one or more computing devices (e.g., computers (e.g., desktop computers, laptop computers, and/or the like) mobile computing devices (e.g., tablet computers, smartphones, and/or the like), wearable computing devices (e.g., smart watches, and/or the like), and/or the like) associated with a common (or the same) user. System 102 can include one or more processors 108, one or more sensors 110, one or more communication interfaces 112, and memory 114. Sensor(s) 110 can include components (e.g., circuitry and/or the like) configured to determine and/or receive data indicating a geographic location of one or more computing devices of system 102 (e.g., a global positioning system (GPS) receiver, circuitry configured to determine a location based on signals, signal identifiers, signal strength, and/or the like received via communication interface(s) 112, and/or the like). Communication interface(s) 112 can include one or more interfaces (e.g., network interfaces, wired interfaces, wireless interfaces, and/or the like) configured to enable system 102 (e.g., one or more computing devices of system 102) to communicate (e.g., via network(s) 104, and/or the like) with one or more other computing devices of environment 100 (e.g., system 106, one or more computing devices of system 106, and/or the like). Memory 114 can include instructions 116, which when executed by processor(s) 108 can cause system 102 (e.g., one or more computing devices of system 102) to perform one or more operations described herein. For example, memory 114 can include one or more applications 118 (e.g., application programs, and/or the like) and application programming interface (API) 120. In accordance with embodiments of the disclosure, API 120 can be configured to determine semantic location information. In some embodiments, a user of system 102 can consent (e.g., opt-in, and/or the like) to the functionality of API 120 (e.g., with respect to one or more of application(s) 118, and/or the like). Additionally or alternatively, a user of system 102 can deny access (e.g., opt-out, and/or the like) of the functionality of API 120 (e.g., with respect to one or more of application(s) 118, and/or the like).

System 106 can be remotely located from system 102 (e.g., located at a geographic location remote from a geographic location at which system 102 is located). System 106 can include one or more computing devices (e.g., computers, servers, mainframes, virtual computing platforms, and/or the like). System 106 can include one or more processors 122, one or more communication interfaces 124, and memory 126. Communication interface(s) 124 can include one or more interfaces (e.g., network interfaces, wired interfaces, wireless interfaces, and/or the like) configured to enable system 106 (e.g., one or more computing devices of system 106) to communicate (e.g., via network(s) 104, and/or the like) with one or more other computing devices of environment 100 (e.g., system 102, one or more computing devices of system 102, and/or the like). Memory 126 can include instructions 128, which when executed by processor(s) 122 can cause system 106 (e.g., one or more computing devices of system 106) to perform one or more operations described herein. Memory 126 can also include (e.g., store, host, and/or the like) one or more databases 130, which can include data and/or information described herein.

Figure 2A:
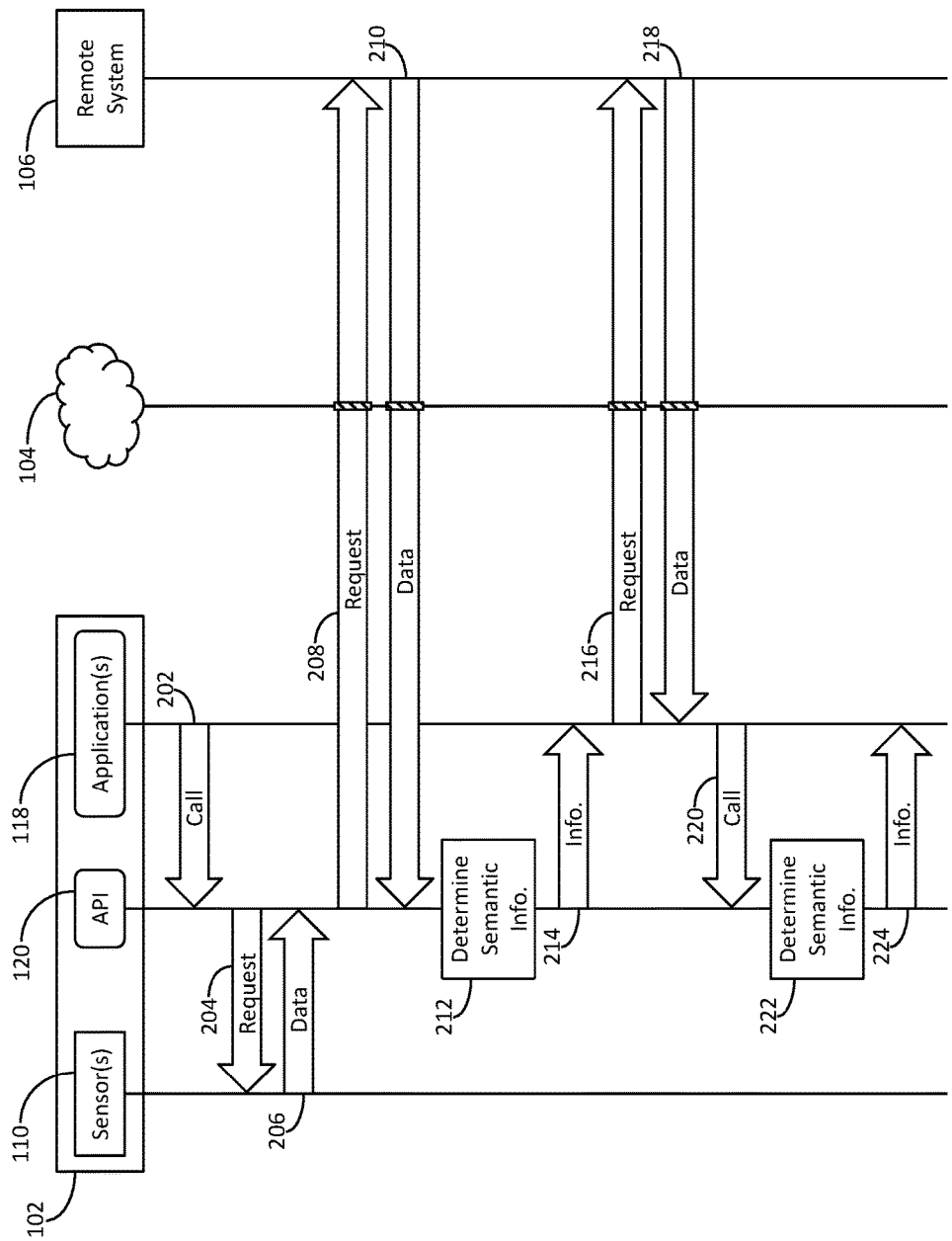
FIGS. 2A-C depict an example event sequence according to example embodiments of the present disclosure.
Figure 2B:
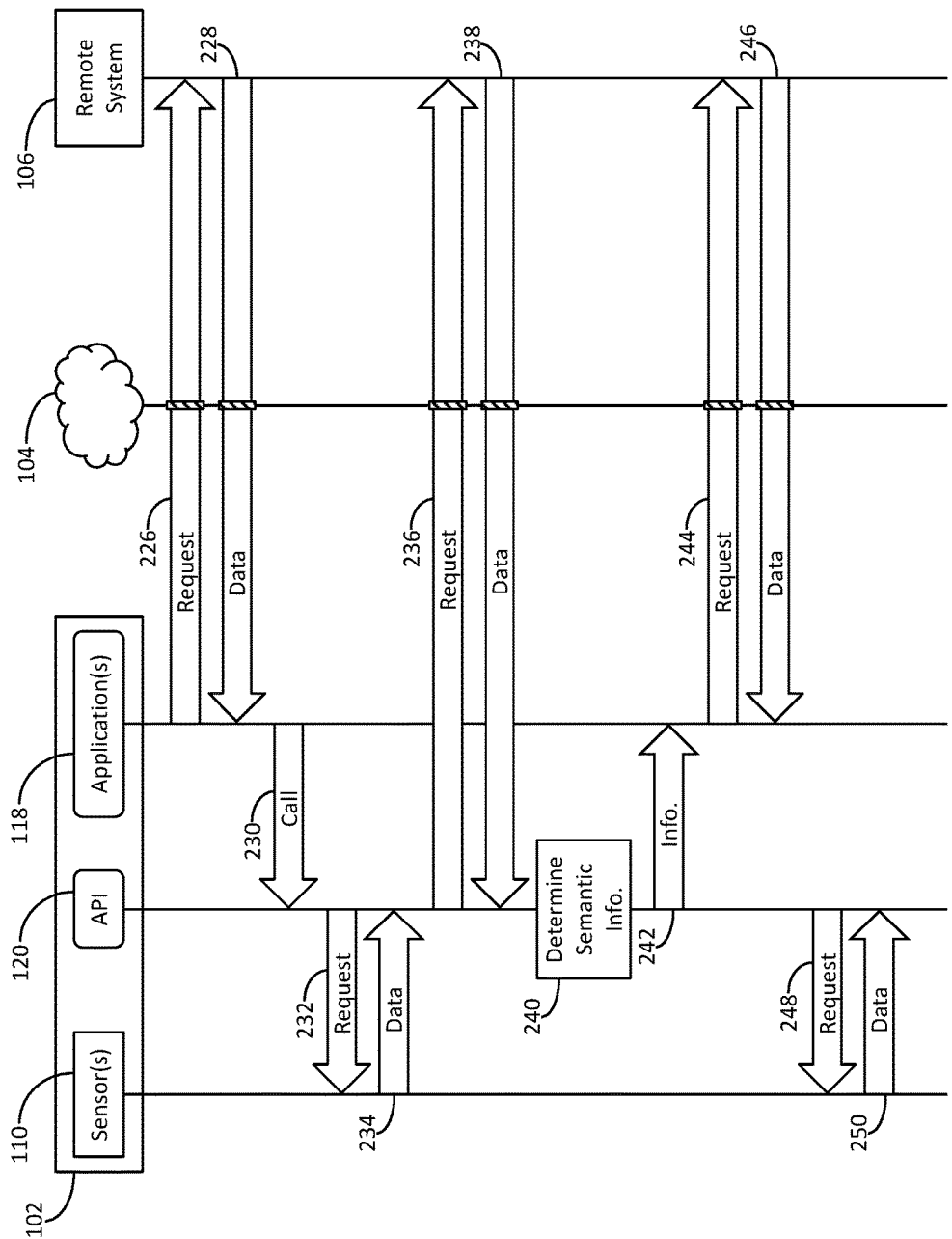
Figure 2C:
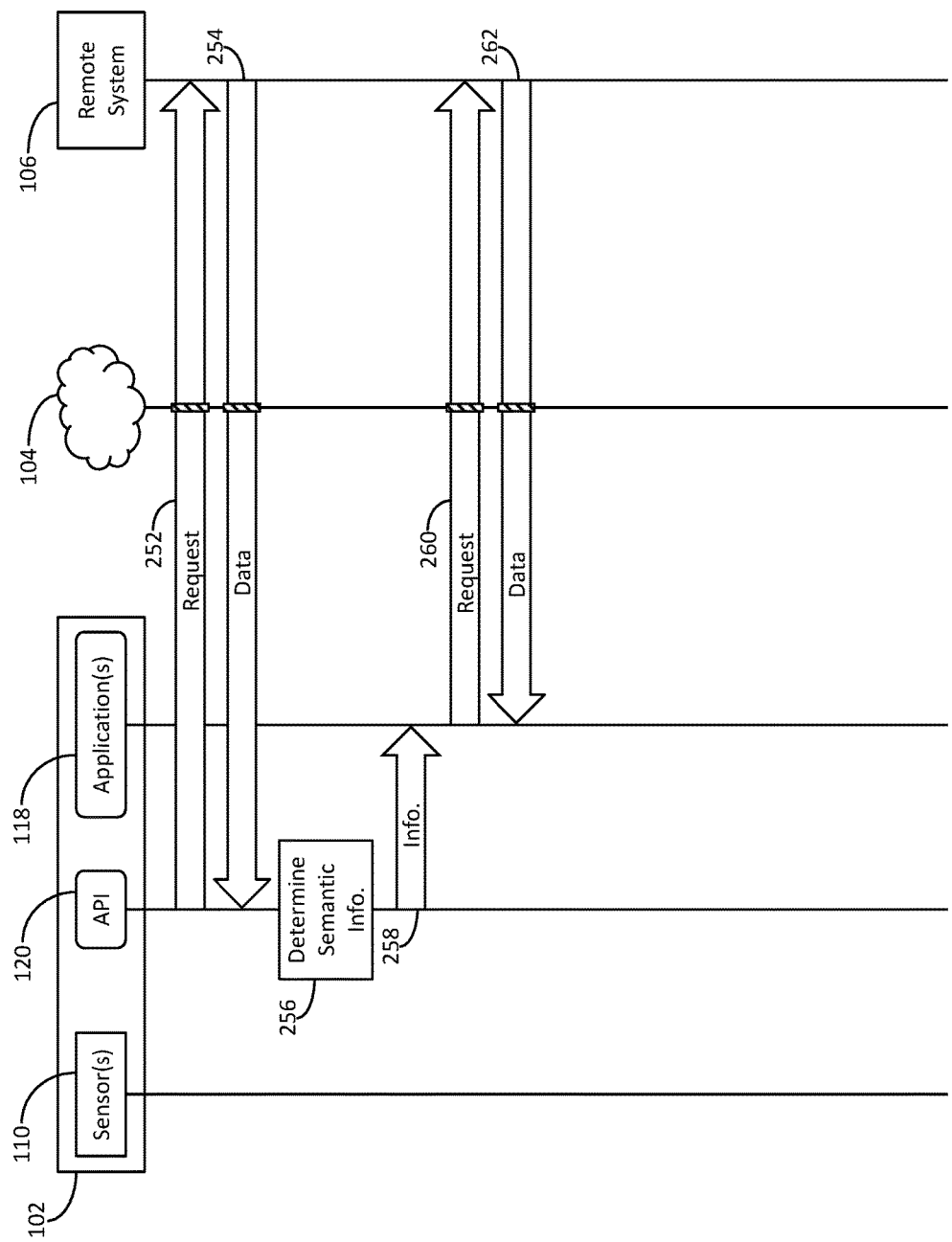

FIGS. 2A-C depict an example event sequence according to example embodiments of the present disclosure. Referring to FIG. 2A, at (202), an application of application(s) 118 (e.g., an application executing on one or more computing devices of system 102) can make a call (e.g., communicate data, and/or the like) to API 120 requesting semantic information about a location of one or more computing devices of system 102. API 120 can receive the call requesting the semantic information from the application of application(s) 118. In some embodiments, the API call can request semantic information about a contemporaneously determined location (e.g., of the computing device(s) of system 102). Responsive to receiving the call, at (204), API 120 can request contemporaneous sensor data from sensor(s) 110, for example, data indicating a contemporaneous (e.g., recent, current, and/or the like) geographic location of the computing device(s) of system 102 (e.g., data received and/or determined by a GPS receiver of system 102 (e.g., latitude and longitude coordinates), data indicating a geographic position of the computing device(s) of system 102 determined based on triangulating signals received by system 102 (e.g., via communication interface(s) 112, and/or the like) from transmitters for which geographic locations are known, one or more identifiers of such signals, the strength of such signals, and/or the like). At (206), sensor(s) 110 can communicate the data indicating the contemporaneous geographic location of the computing device(s) of system 102 to API 120, which can receive the data indicating the contemporaneous geographic location of the computing device(s) of system 102.

At (208), API 120 can communicate (e.g., via network(s) 104, as indicated by the cross-hatched box over the line extending downward from network(s) 104, and/or the like) a request for data to system 106. For example, the request can be for semantic information corresponding to a geographic location indicated by the data indicating the contemporaneous geographic location of the computing device(s) of system 102 received (e.g., at (206)) from sensor(s) 110 (e.g., information indicating and/or referencing a street address associated with the geographic location, the name of one or more businesses associated with the geographic location, the name of a road and/or street associated with the geographic location, the name and/or identifier of transit infrastructure associated with the geographic location, and/or the like), and/or the request can comprise the data indicating the contemporaneous geographic location of the computing device(s) of system 102 received (e.g., at (206)) from sensor(s) 110 (a portion thereof, and/or the like). Additionally or alternatively, the request can request data (e.g., data associated with a search history, calendar, email contents, and/or the like) identified based on a user profile, identifier, and/or the like associated with a user of the computing device(s) of system 102 (e.g., a user in possession of the computing device(s) of system 102), and/or the request can comprise data indicating the user profile, identifier, and/or the like. System 106 can identify, for example, in database(s) 130 (e.g., based on the data indicating the contemporaneous geographic location of the computing device(s) of system 102 received from sensor(s) 110 (e.g., at (206)), the user profile, identifier, and/or the like), the requested data (a portion thereof, and/or the like), and, at (210), system 106 can communicate the requested data (the portion thereof, and/or the like) to API 120, which can receive the requested data (the portion thereof, and/or the like) from system 106.

At (212), API 120 can determine (e.g., based on the data received from sensor(s) 110 (e.g., at (206)), the data received from system 106 (e.g., at (210)), and/or the like) semantic information for the contemporaneous geographic location of the computing device(s) of system 102. The semantic information can include data semantically identifying the geographic location of the computing device(s) of system 102 (e.g., information indicating and/or referencing a street address associated with the geographic location, the name of one or more businesses associated with the geographic location, the name of a road and/or street associated with the geographic location, the name and/or identifier of transit infrastructure associated with the geographic location, and/or the like) and indicating whether the user associated with the computing device(s) of system 102 is stationary at the geographic location or in transit from the geographic location. At (214), API 120 can return (e.g., communicate, and/or the like) the semantic information to the application of application(s) 118 (e.g., the application that made the call at (202)).

In some embodiments, the data semantically identifying the geographic location of the computing device(s) of system 102 can include an identifier corresponding to an entry in database(s) 130 (e.g., a database of places, and/or the like). In such embodiments, at (216), the application of application(s) 118 can utilize the identifier to communicate a request for additional data (e.g., descriptive information, and/or the like) about the geographic location of the computing device(s) of system 102 to system 106, which can receive the request from the application of application(s) 118. Responsive to receiving the request from the application of application(s) 118, system 106 can identify the requested additional data (a portion thereof, and/or the like) (e.g., by utilizing the identifier to identify the entry (e.g., comprising the additional information (the portion thereof, and/or the like)), and/or the like) and, at (218), can communicate the additional information (the portion thereof, and/or the like) to the application of application(s) 118, which can utilize the additional information (the portion thereof, and/or the like) (e.g., to provide useful information to the user of the computing device(s) of system 102, and/or the like).

In some embodiments, API 120 can determine (e.g., at (212)) a level of confidence (e.g., a value (e.g., [0, 1]) indicating a degree of confidence) that the data semantically identifying the geographic location of the computing device(s) of system 102 is accurate (e.g., the data semantically identifying the location can indicate that the location corresponds to a particular business, the level of confidence can indicate the degree to which API 120 is confident the location actually corresponds to the particular business, and/or the like). In such embodiments, API 120 can return (e.g., at (214)) data indicating the level of confidence to the application of application(s) 118.

In some embodiments, API 120 can determine (e.g., at (212)) that the geographic location of the computing device(s) of system 102 corresponds to multiple semantically identifiable locations. For example, API 120 can determine that the location corresponds to a coffee shop, a mall, and a shopping center. Responsive to determining that the geographic location of the computing device(s) of system 102 corresponds to multiple semantically identifiable locations, API 120 can determine a hierarchy of the multiple semantically identifiable locations and can return (e.g., at (214)) data indicating the hierarchy to the application of application(s) 118. For example, API 120 can determine that the coffee shop is within the mall and that the mall is within the shopping center, and the hierarchy can indicate that the coffee shop is within the mall and that the mall is within the shopping center.

At (220), an application of application(s) 118 (e.g., an application executing on one or more computing devices of system 102) can make a call (e.g., communicate data, and/or the like) to API 120 requesting semantic information about a location of one or more computing devices of system 102. It will be appreciated that the application of application(s) 118 making the call at (220) can be a common (or the same)

application as the application that made the call at (202) or a distinct (or different) application from the application that made the call at (202). API 120 can receive the call requesting the semantic information from the application of application(s) 118. In some embodiments, the API call can request semantic information about a most recently determined location (e.g., of the computing device(s) of system 102). Responsive to receiving the call, at (222), API 120 can determine (e.g., based on historical data stored in memory 114 (e.g., at (212)) semantic information for the most recently determined location of the computing device(s) of system 102. At (224), API 120 can return (e.g., communicate, and/or the like) the semantic information to the application of application(s) 118 (e.g., the application that made the call at (220)).

As indicated above, in some embodiments, the data semantically identifying the geographic location of the computing device(s) of system 102 can include an identifier corresponding to an entry in database(s) 130 (e.g., a database of places, and/or the like). Referring to FIG. 2B, in such embodiments, at (226), the application of application(s) 118 can utilize the identifier to communicate a request for additional data (e.g., descriptive information, and/or the like) about the geographic location of the computing device(s) of system 102 to system 106, which can receive the request from the application of application(s) 118. Responsive to receiving the request from the application of application(s) 118, system 106 can identify the requested additional data (a portion thereof, and/or the like) (e.g., by utilizing the identifier to identify the entry (e.g., comprising the additional information (the portion thereof, and/or the like)), and/or the like) and, at (228), can communicate the additional information (the portion thereof, and/or the like) to the application of application(s) 118, which can utilize the additional information (the portion thereof, and/or the like) (e.g., to provide useful information to the user of the computing device(s) of system 102, and/or the like).

At (230), an application of application(s) 118 (e.g., an application executing on one or more computing devices of system 102) can make a call (e.g., communicate data, and/or the like) to API 120 requesting semantic information about a location of one or more computing devices of system 102. It will be appreciated that the application of application(s) 118 making the call at (230) can be a common (or the same) application as the application that made the call at (202) and/or the application that made the call at (220) or a distinct (or different) application from the application that made the call at (202) and/or the application that made the call at (220). API 120 can receive the call requesting the semantic information from the application of application(s) 118. In some embodiments, the API call can request updates in response to one or more changes in the semantic information about the location of the computing device(s) of system 102. Responsive to receiving the call, at (232), API 120 can request contemporaneous sensor data from sensor(s) 110, for example, data indicating a contemporaneous (e.g., recent, current, and/or the like) geographic location of the computing device(s) of system 102. At (234), sensor(s) 110 can communicate the data indicating the contemporaneous geographic location of the computing device(s) of system 102 to API 120, which can receive the data indicating the contemporaneous geographic location of the computing device(s) of system 102.

At (236), API 120 can communicate a request for data to system 106. For example, the request can be for semantic information corresponding to a geographic location indicated by the data indicating the contemporaneous geographic location of the computing device(s) of system 102 received from sensor(s) 110 (e.g., at (234)), and/or the request can comprise the data indicating the contemporaneous geographic location of the computing device(s) of system 102 received (e.g., at (234)) from sensor(s) 110 (a portion thereof, and/or the like). Additionally or alternatively, the request can request data identified based on a user profile, identifier, and/or the like associated with a user of the computing device(s) of system 102, and/or the request can comprise data indicating the user profile, identifier, and/or the like. System 106 can identify, for example, in database(s) 130 (e.g., based on the data indicating the contemporaneous geographic location of the computing device(s) of system 102 received from sensor(s) 110 (e.g., at (234)), the user profile, identifier, and/or the like), the requested data (a portion thereof, and/or the like), and, at (238), system 106 can communicate the requested data (the portion thereof, and/or the like) to API 120, which can receive the requested data (the portion thereof, and/or the like) from system 106.

At (240), API 120 can determine (e.g., based on the data received from sensor(s) 110 (e.g., at (234)), the data received from system 106 (e.g., at (238)), historical data stored in memory 114 (e.g., at (212) and/or (222)), and/or the like) semantic information for the geographic location of the computing device(s) of system 102. At (242), API 120 can return (e.g., communicate, and/or the like) the semantic information to the application of application(s) 118 (e.g., the application that made the call at (230)).

As indicated above, in some embodiments, the semantic information can include data indicating that the user of the computing device(s) of system 102 is in transit from the location. In such embodiments, API 120 can determine (e.g., at (240)) a modality of the transit (e.g., driving, riding a train, flying, walking, utilizing mass transit infrastructure, and/or the like) and can return (e.g., at (242)) data indicating the modality to the application of application(s) 118. In some embodiments, API 120 can determine (e.g., at (240)) a level of confidence (e.g., a value (e.g., [0, 1]) indicating a degree of confidence) that the data indicating the modality of transit is accurate (e.g., the data indicating the modality of transit can indicate the user is walking, the level of confidence can indicate the degree to which API 120 is confident the user is actually walking, and/or the like). In such embodiments, API 120 can return (e.g., at (242)) data indicating the level of confidence to the application of application(s) 118.

As indicated above, in some embodiments, the data semantically identifying the geographic location of the computing device(s) of system 102 can include an identifier corresponding to an entry in database(s) 130 (e.g., a database of places, and/or the like). In such embodiments, at (244), the application of application(s) 118 can utilize the identifier to communicate a request for additional data (e.g., descriptive information, and/or the like) about the geographic location of the computing device(s) of system 102 to system 106, which can receive the request from the application of application(s) 118. Responsive to receiving the request from the application of application(s) 118, system 106 can identify the requested additional data (a portion thereof, and/or the like) (e.g., by utilizing the identifier to identify the entry (e.g., comprising the additional information (the portion thereof, and/or the like)), and/or the like) and, at (246), can communicate the additional information (the portion thereof, and/or the like) to the application of application(s) 118, which can utilize the additional information (the portion thereof, and/or the like) (e.g., to provide useful information to the user of the computing device(s) of system 102, and/or the like).

As indicated above, the call received from the application of application(s) 118 (e.g., at (230)) can request updates in response to one or more changes in the semantic information about the location of the computing device(s) of system 102. Accordingly, responsive to receiving the call, at (248), API 120 can request contemporaneous sensor data from sensor(s) 110, for example, data indicating a contemporaneous (e.g., recent, current, and/or the like) geographic location of the computing device(s) of system 102. At (250), sensor(s) 110 can communicate the data indicating the contemporaneous geographic location of the computing device(s) of system 102 to API 120, which can receive the data indicating the contemporaneous geographic location of the computing device(s) of system 102.

Referring to FIG. 2C, at (252), API 120 can communicate a request for data to system 106. For example, the request can be for semantic information corresponding to a geographic location indicated by the data indicating the contemporaneous geographic location of the computing device(s) of system 102 received from sensor(s) 110 (e.g., at (250)), and/or the request can comprise the data indicating the contemporaneous geographic location of the computing device(s) of system 102 received (e.g., at (250)) from sensor(s) 110 (a portion thereof, and/or the like). Additionally or alternatively, the request can request data identified based on a user profile, identifier, and/or the like associated with a user of the computing device(s) of system 102, and/or the request can comprise data indicating the user profile, identifier, and/or the like. System 106 can identify, for example, in database(s) 130 (e.g., based on the data indicating the contemporaneous geographic location of the computing device(s) of system 102 received from sensor(s) 110 (e.g., at (250)), the user profile, identifier, and/or the like), the requested data (a portion thereof, and/or the like), and, at (254), system 106 can communicate the requested data (the portion thereof, and/or the like) to API 120, which can receive the requested data (the portion thereof, and/or the like) from system 106.

At (256), API 120 can determine (e.g., based on the data received from sensor(s) 110 (e.g., at (250)), the data received from system 106 (e.g., at (254)), historical data stored in memory 114 (e.g., at (212), (222), and/or (240)), and/or the like) semantic information for the geographic location of the computing device(s) of system 102. In some embodiments, API 120 can determine (e.g., at (256)) that there has been a change in the semantic information. For example, API 120 can determine (e.g., at (256)) that the user associated with the computing device(s) of system 102 is located at a semantically identifiable location distinct from a semantically identifiable location at which the user was previously determined (e.g., at (212), (222), and/or (240)) to be located (e.g., API 120 can determine that the user is located at a business different from a business at which the user was previously determined to be located). Additionally or alternatively, API 120 can determine (e.g., at (256)) that the user associated with the computing device(s) of system 102 is in transit from a location at which the user was previously determined (e.g., at (212), (222), and/or (240)) to be stationary (e.g., API 120 can determine that the user has left a business at which the user was previously determined to be located and is now on a road driving away from the business); and/or API 120 can determine (e.g., at (256)) that the user associated with the computing device(s) of system 102 is in transit via a modality different from a modality via which the user was previously determined (e.g., at (212), (222), and/or (240)) to be in transit (e.g., API 120 can determine that the user previously determined to be driving is now walking). At (258) (e.g., responsive to determining that there has been a change in the semantic information), API 120 can return (e.g., communicate, and/or the like) the semantic information (e.g., data indicating the change in the semantic information) to the application of application(s) 118 (e.g., the application that made the call at (230)).

As indicated above, in some embodiments, the data semantically identifying the geographic location of the computing device(s) of system 102 can include an identifier corresponding to an entry in database(s) 130 (e.g., a database of places, and/or the like). In such embodiments, at (260), the application of application(s) 118 can utilize the identifier to communicate a request for additional data (e.g., descriptive information, and/or the like) about the geographic location of the computing device(s) of system 102 to system 106, which can receive the request from the application of application(s) 118. Responsive to receiving the request from the application of application(s) 118, system 106 can identify the requested additional data (a portion thereof, and/or the like) (e.g., by utilizing the identifier to identify the entry (e.g., comprising the additional information (the portion thereof, and/or the like)), and/or the like) and, at (262), can communicate the additional information (the portion thereof, and/or the like) to the application of application(s) 118, which can utilize the additional information (the portion thereof, and/or the like) (e.g., to provide useful information to the user of the computing device(s) of system 102, and/or the like).

FIGS. 3A-D depict example data objects according to example embodiments of the present disclosure. For example, FIG. 3A depicts an example data object for a stationary user, FIG. 3B depicts an example data object for a user in transit, and FIGS. 3C and 3D depict example data objects for semantic location events (e.g., associated with changes in semantic information).

FIGS. 4A-C depict example pseudo code for example methods according to example embodiments of the present disclosure. For example, FIG. 4A depicts pseudo code for determining whether a user is stationary or in transit, and FIGS. 4B and 4C depict pseudo code for determining semantic location events (e.g., associated with changes in semantic information).

Figure 5:
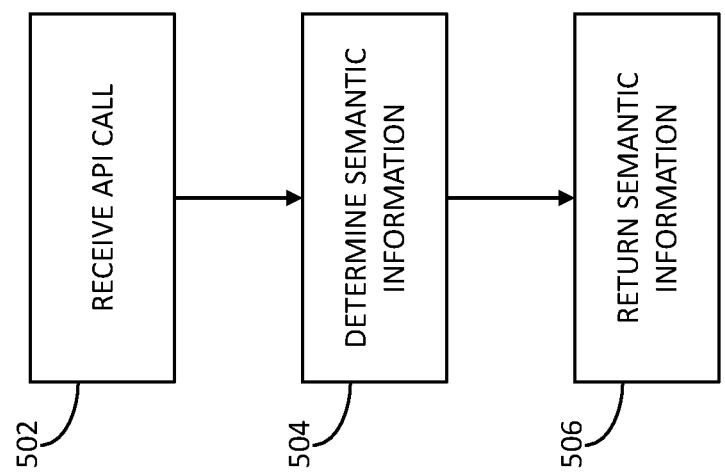
FIG. 5 depicts a flow chart diagram of an example method according to example embodiments of the present disclosure.

FIG. 5 depicts a flow chart diagram of an example method according to example embodiments of the present disclosure. Referring to FIG. 5, at (502), an API call can be received. For example, API 120 can receive, from an application of application(s) 118, an API call requesting semantic information about a location of one or more computing devices of system 102. At (504), semantic information can be determined. For example, API 120 can determine semantic information for the location of the computing device(s) of system 102. At (506), the semantic information can be returned. For example, API 120 can return, to the application of application(s) 118, the semantic information determined for the location of the computing device(s) of system 102.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A system for determining semantic location information, the system comprising:
   one or more processors; and
   a memory storing instructions that when executed by the one or more processors cause the system to perform operations comprising:
      receiving, from an application program being executed by the system, an application programming interface (API) call requesting updates in response to one or more changes in semantic information about a location of a computing device of the system; and
      responsive to receiving the API call:
         determining a change in semantic information for the location comprising data semantically identifying the location and indicating whether a user associated with the computing device is stationary at the location or in transit from the location; and
         responsive to determining the change in the semantic information, returning, to the application program and via the API, the semantic information.

2. The system of claim 1, wherein determining the change comprises determining that the user is located at a semantically identifiable location distinct from a semantically identifiable location at which the user was previously determined to be located.

3. The system of claim 1, wherein:
   the data indicates the user is in transit from the location; and
   determining the change comprises determining the user was previously stationary at the location.

4. The system of claim 1, wherein:
   the data indicates the user is in transit from the location; and
   determining the change comprises determining the user is in transit via a modality different from a modality via which the user was previously determined to be in transit.

* * * * *